US009699186B2

(12) United States Patent
Lu et al.

(10) Patent No.: US 9,699,186 B2
(45) Date of Patent: Jul. 4, 2017

(54) SCHEDULE RECORDING METHOD

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 5 days.

(21) Appl. No.: 14/381,777

(22) PCT Filed: Jul. 30, 2013

(86) PCT No.: PCT/CN2013/080407
§ 371 (c)(1),
(2) Date: Aug. 28, 2014

(87) PCT Pub. No.: WO2014/082462
PCT Pub. Date: Jun. 5, 2014

(65) Prior Publication Data
US 2015/0358324 A1 Dec. 10, 2015

(30) Foreign Application Priority Data

Nov. 27, 2012 (CN) .......................... 2012 1 0490694

(51) Int. Cl.
*G06F 21/62* (2013.01)
*H04L 29/06* (2006.01)

(52) U.S. Cl.
CPC ...... *H04L 63/0884* (2013.01); *H04L 63/0428* (2013.01); *H04L 63/0807* (2013.01); *H04L 63/0876* (2013.01); *H04L 63/101* (2013.01); *H04L 63/102* (2013.01)

(58) Field of Classification Search
CPC .... G06Q 10/06; G06Q 20/40; G06Q 30/0269; G06F 17/30864; G06F 17/30321; G06F 17/30554; G06F 21/31; G06F 21/41; H04L 63/08; H04L 63/0815; H04L 63/102; H04L 63/0807; H04L 63/0428; H04L 63/101; H04L 63/0876; H04L 63/0884; H04L 9/3226
USPC ............................ 726/5, 1, 2, 13, 18, 19, 27
See application file for complete search history.

(56) References Cited

U.S. PATENT DOCUMENTS

| | | | | |
|---|---|---|---|---|
| 4,845,625 A | * | 7/1989 | Stannard ................ | G06Q 10/06 705/5 |
| 2001/0027520 A1 | * | 10/2001 | Mori ...................... | G06Q 20/40 713/186 |
| 2002/0099936 A1 | * | 7/2002 | Kou ..................... | H04L 63/0442 713/151 |

(Continued)

*Primary Examiner* — Amir Mehrmanesh
*Assistant Examiner* — Sakinah Taylor
(74) *Attorney, Agent, or Firm* — Hammer & Associates, P.C.

(57) ABSTRACT

A schedule recording method includes the following steps: an authentication server receiving triggering information and then acquiring key information from the triggering information, the key information comprising an authentication code; acquiring an authentication window, and searching the authentication window for the authentication code; if the authentication code is found, extracting a time factor corresponding to the authentication code, and generating and storing an authentication code list and/or staff log.

3 Claims, 4 Drawing Sheets

(56) References Cited

U.S. PATENT DOCUMENTS

| | | | | |
|---|---|---|---|---|
| 2004/0027336 A1* | 2/2004 | Ishii | ............... | B60R 25/102 |
| | | | | 345/169 |
| 2005/0277420 A1* | 12/2005 | Shin | ............... | H04L 63/0815 |
| | | | | 455/442 |
| 2012/0078639 A1 | 3/2012 | Kumar | | |
| 2013/0129084 A1* | 5/2013 | Appleton | ............ | H04W 12/02 |
| | | | | 380/30 |

* cited by examiner

SCHEDULE RECORDING METHOD

TECHNICAL FIELD

The present invention relates to information security field, and in particular relates to a routine recording method.

PRIOR ART

The inventor finds at least following shortcomings in prior art when realizing the invention that the conventional method for recording a person's routine is dependent upon a personal report and therefore the conventional method lacks monitoring, is convenience to be forged, and has a low efficiency.

SUMMARY OF THE INVENTION

For overcoming shortcomings in the prior art, a routine recording method is provided by the invention.

The invention is implemented by the below solutions.

A routine recording method, comprising:

Step A), receiving, by an authentication server, trigger information and obtaining critical information in the trigger information;

Step B), if the critical information is an authentication code, obtaining, by the authentication server, all authentication windows and checking for the authentication code in the authentication windows, if the authentication code is checked, extracting a time factor corresponding to the authentication code, recording a device identifying code corresponding to the authentication code, checking for address information corresponding to the device identifying code, generating and storing authentication code list and/or working staff log; and if the address information is not found, doing exception handling; or if the critical information comprises a device identifying code and an authentication code, obtaining, by the authentication server, an authentication window corresponding to the device identifying code, checking for the authentication code in the authentication window, if the authentication code is found, extracting a time factor corresponding to the authentication code, checking for corresponding address information according to the device identifying code, generating and storing authentication code list and/or working staff log, and if the authentication code is not found, doing exception handling; or if the critical information comprises a working staff identification and an authentication code, obtaining, by the authentication server, an authentication window corresponding to the working staff identification, checking for the authentication code in the authentication window, if the authentication code is found, extracting a time factor corresponding to the authentication code, recording a device identifying code corresponding to the authentication code, checking for corresponding address information according to the device identifying code, generating and storing authentication code list and/or working staff log, and if the address information is not found, doing exception handling; or if the critical information comprises a working staff identification, a device identifying code and an authentication code, obtaining, by the authentication server, an authentication window corresponding to the device identifying code, checking for the authentication code in the authentication window, if the authentication code is found, extracting a time factor corresponding to the authentication code, checking for corresponding address information according to the device identifying code, generating and storing authentication code list and/or working staff log, and if the address information is not found, doing exception handling;

in which the authentication code is generated by an authentication code generating device; the authentication code list comprises the authentication code and corresponding authentication code generating time; the working staff log comprises the working staff identification, the address information and time of the working staff arriving at the address; the authentication code generating time and the time of the working staff arriving at the address is computed by the authentication server according to the time factor corresponding to the authentication code.

If the critical information is an authentication code; obtaining, by the authentication server, all authentication windows comprises:

obtaining all authentication windows stored in the authentication server; or obtaining all authentication window information stored in the authentication server and generating authentication windows respectively according to the obtained authentication window information.

If the critical information comprises a device identifying code and an authentication code, obtaining the authentication window corresponding to the device identifying code comprises:

determining whether the device identifying code is legitimate, if yes, obtaining the authentication window corresponding to the device identifying code; and if no, prompting that the device identifying code is not legitimate and doing not obtain the authentication window again.

The obtaining the authentication window corresponding to the device identifying code comprises:

obtaining the authentication window corresponding to the device identifying code, stored in the authentication server; or obtaining authentication window information corresponding to the device identifying code, stored in the authentication server and generating the authentication window according to the obtained authentication window information.

If the critical information comprises a working staff identification and an authentication code, before obtaining the authentication window corresponding to the working staff identification, the method further comprises determining whether the working staff identification is legitimate, if yes, obtaining the authentication window; and if no, prompting that the working staff identification is not legitimate and doing not obtain the authentication window.

The obtaining the authentication window corresponding to the working staff identification comprises obtaining all authentication windows corresponding to the working staff identification, stored in the authentication server; or obtaining all authentication window information corresponding to the working staff identification, stored in the authentication server and generating authentication windows respectively according to the obtained all authentication window information.

If the critical information comprises a working staff identification, a device identifying code and an authentication code, before obtaining the authentication window corresponding to the device identifying code, the method further comprises determining whether the working staff identification and the device identifying code are legitimate, if yes, obtaining the authentication window corresponding to the device identifying code; and if no, prompting corresponding information and doing not obtain the authentication window again, in which the corresponding information comprises that the working staff identification is not legitimate, the device identifying code is not legitimate and the working staff identification does not match the device identifying code.

The obtaining the authentication window corresponding to the device identifying code comprises:

obtaining the authentication window corresponding to the device identifying code, stored in the authentication server; or obtaining authentication window information corresponding to the device identifying code, stored in the authentication server, and generating the authentication window according to the obtained authentication window information.

The authentication window stored in the authentication server is a window comprised of all authentication codes pre-computed by the authentication server according to seed information of the authentication code generating device within a preset time period.

The generating authentication windows respectively according to the obtained authentication window information and checking for the authentication code in the authentication windows comprises:

Step a), setting a first variable, assigning an initial value to the first variable, obtaining current time of the authentication server, computing a current time factor according to the current time of the authentication server and assigning the current time factor to a second variable, generating an authentication code according to a value of the second variable and comparing the generated authentication code with the authentication code, if a match is found, determining that the authentication code is found; and if the match is not found, going to Step b);

Step b), self-adding a preset value to the first variable and determining whether the value of the first variable is satisfied with a preset condition, if yes, going to Step c); and if no, determining that the authentication code is not found;

Step c), adding the first variable to the second variable, generating an authentication code according to the computing result, comparing the generated authentication code with the authentication code, if a match is found, determining that the authentication code is found; and if the match is not found, going to Step d); and Step d), deducting the first variable from the second variable, generating an authentication code according to the computing result, comparing the generated authentication code with the authentication code, if a match is found, determining that the authentication code is found; and if no, returning to Step b.

Advantages of the invention include providing a routine recording solution which has a high security and flexibility compared with the present routine recording method and can prevent to be copied efficiently.

DETAILED DESCRIPTION OF DRAWINGS OF THE INVENTION

For clarifying embodiments of the invention or technical solutions in the prior art, the drawings accompanying with the embodiments or the prior art are described below simply, and obviously, the drawings described herein are just drawings of some embodiments of the invention, and according to which, other drawings can be obtained by those skilled in the art without involving an inventive effort.

DETAILED DESCRIPTION OF EMBODIMENTS OF THE INVENTION

Figure 1:
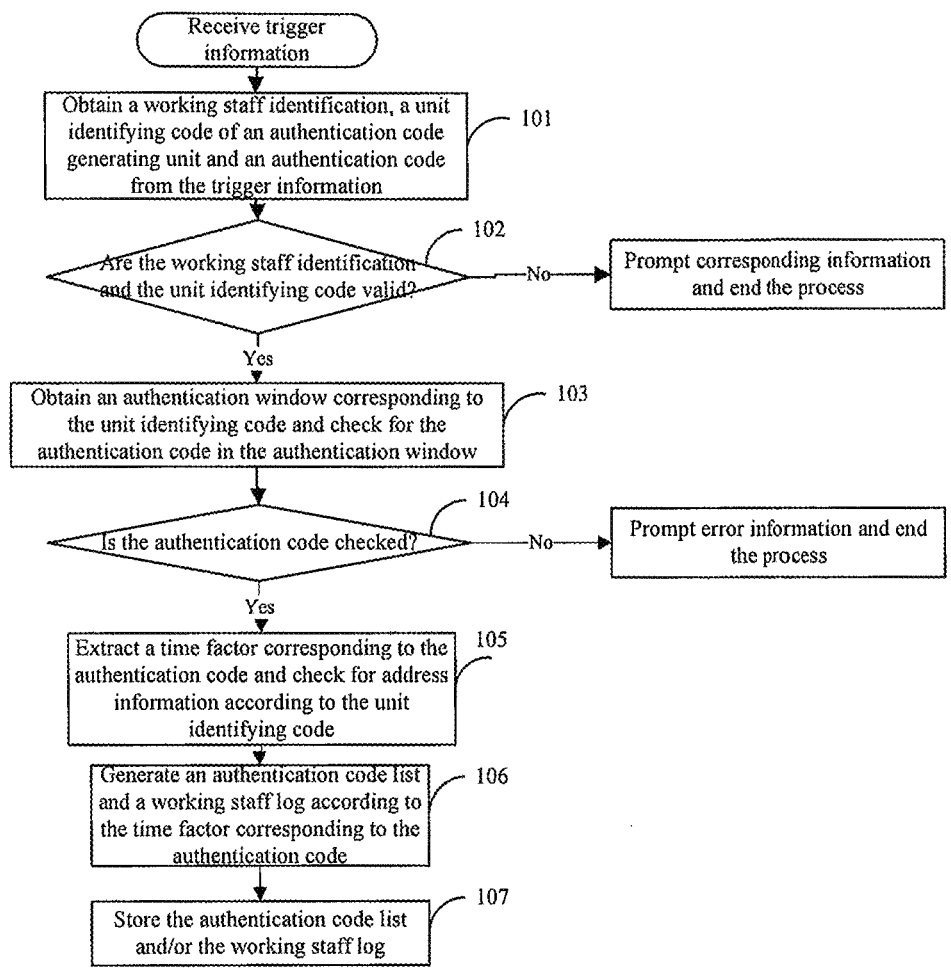
FIG. 1 is a flow chart of a routine recording method disclosed in Embodiment 2 of the invention.
Figure 2:
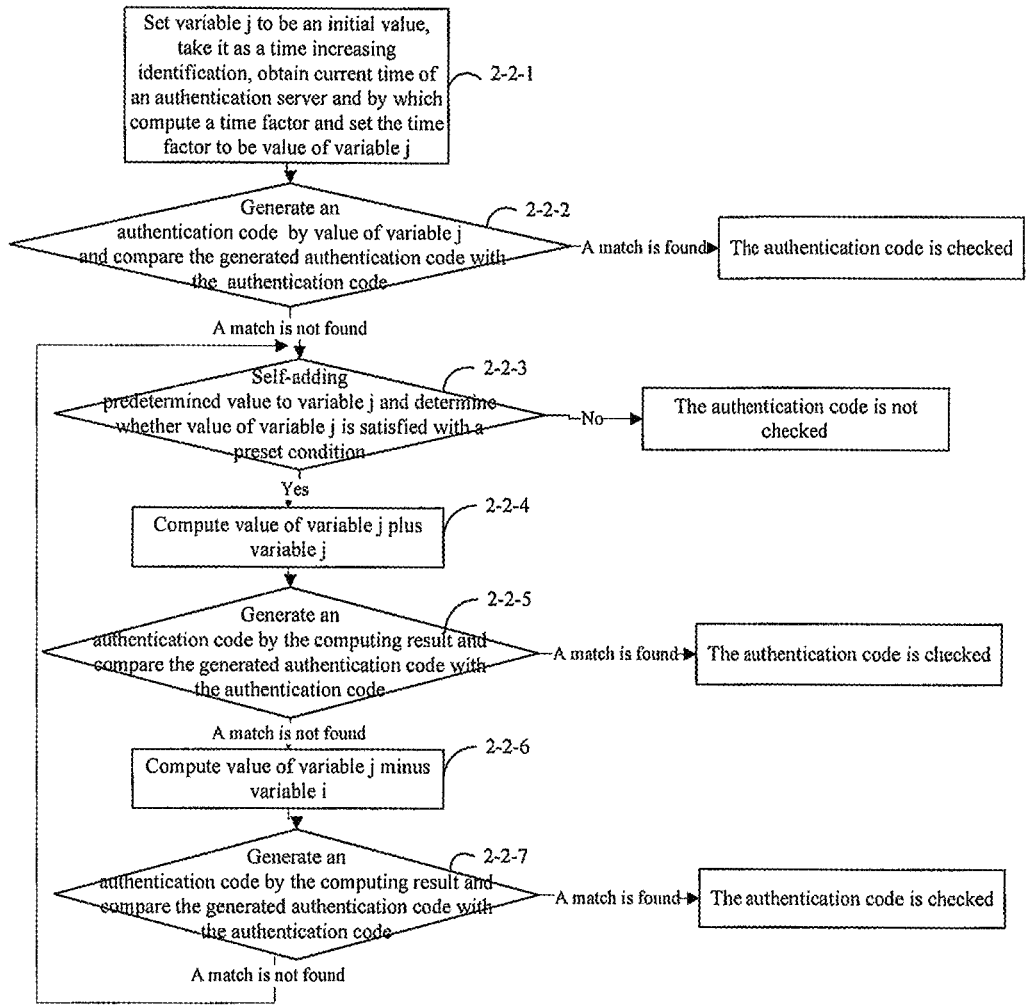
FIG. 2 is a detailed flow chart of Step 2-2 in Embodiment 2 of the invention.

Embodiments of the invention are described in detail in combination with the drawings of the invention, and obviously the described embodiments are just part of embodiments of the invention, not all embodiments. Based on the embodiments of the invention, all other embodiments obtained by those skilled in the art without involving an inventive effort should fall below the scope of protection of the invention.

The method of the invention is implemented by an authentication server along with an authentication code generating device. Each authentication code generating device has a unique identification, viz. a device identifying code, which distinguishes the device from other authentication code generating device. Before implementing the method, it needs to place the authentication code generating device in a designated position and store a mapping relation of device identifying code of the authentication code generating device and its address into the authentication server; at the same time the authentication server stores information of working staff and authentication code generating device.

Embodiment 1

A routine recording method is provided in the embodiment 1, which includes an authentication server receiving trigger information and executing the following steps.

Step A), obtaining critical information in the trigger information, in which the critical information includes an authentication code.

Specifically, in the embodiment 1, the critical information is an authentication code, or a device identifying code and the authentication code, or working staff identification and the authentication code, or the device identifying code, the working staff identification and the authentication code.

The authentication code is generated by the authentication code generating device and the trigger information is sent to the authentication server in the form of short message, telephone or networking.

Step B), obtaining an authentication window and checking for the authentication code in the authentication window, if the authentication code is found, going to Step C); if the authentication code is not found, doing exception handling.

Specifically, the exception handling includes, but not limited to, prompting error information.

Step C), extracting a time factor corresponding to the authentication code, generating and storing authentication code list and/or working staff log.

Specifically, in the embodiment 1, the authentication code list includes the authentication code and corresponding authentication code generating time, and the working staff log includes working staff identification, address information and time of the working staff arriving at the address. The authentication code generating time and the time of the working staff arriving at the address are computed by the authentication server according to a time factor corresponding to the authentication code.

The method further includes that a chart or a table is generated according to information such as the working staff log. For example, a chart is generated in which time of arriving at the address is set to be x-axis and the address information is set to be y-axis or a table is recorded in which an address and whether the address is arrived at are related.

Embodiment 2

As illustrated in FIG. 1, a routine recording method based on an authentication code is provided, which includes the authentication server receiving trigger information and executing the following steps.

Step 101, obtaining working staff identification, a device identifying code of an authentication code generating device and an authentication code from trigger information.

Specifically, in the embodiment 2, the trigger information is sent to the authentication server in the form of short message, telephone and networking and the trigger information includes, but not limited to, working staff identification, the device identifying code and the authentication code in which the authentication code is generated by the authentication code generating device.

Step 102, determining whether the working staff identification and the device identifying code are legitimate, if yes, going to Step 103; if not, prompting corresponding information and ending the process.

Specifically, in the embodiment 2, determining whether the working staff identification is legitimate includes determining whether the working staff identification is stored in the authentication server, if yes, determining that the working staff identification is legitimate; if not, prompting that the working staff identification is not legitimate and ending the process.

Determining whether the device identifying code is legitimate includes determining whether the device identifying code is stored in the authentication server, if yes, determining that the device identifying code is legitimate; if not, prompting that the device identifying code is not legitimate and ending the process.

Step 103, obtaining an authentication window corresponding to the device identifying code and checking for the authentication code in the authentication window.

Specifically, in the embodiment 2, Step 103 includes steps as below.

Step 1-1, checking for an authentication window corresponding to the device identifying code, stored in the authentication server.

Specifically, the authentication window corresponding to the device identifying code, stored in the authentication server is a window comprised of all authentication codes pre-computed by the authentication server according to information corresponding to the authentication code generating device within a preset time period. For example, the preset time period is one day. Specifically, the authentication server computes all authentication codes according to seed information of the authentication code generating device within the current day, forms the authentication window and stores the authentication window in the authentication server.

Step 1-2, comparing the authentication code with all authentication codes within the authentication window, if there is a matched authentication code in the authentication window, the authentication code is found; if there is not a matched authentication code in the authentication window, the authentication code is not found.

Specifically, in the embodiment 2, Step 103 includes following steps.

Step 2-1, obtaining authentication window information corresponding to the device identifying code.

Specifically, the authentication window information is size of the authentication window, viz. a number of all authentication codes of the authentication code generating device corresponding to the device identifying code within a preset time period. The authentication window information is computed by the authentication server according to the preset time period and an authentication code interval in the authentication code generating device corresponding to the device identifying code. The computing result can be obtained by and stored in the authentication server in any time before the obtaining step. Specifically, in the step 2-1, the computing result is read directly. The computing can also be implemented by the authentication server in the step 2-1. Preferably, the preset time period is one day.

Step 2-2, computing and generating authentication window according to the obtained authentication window information and the current authentication server time and comparing the authentication code with all authentication codes in the authentication window.

Specifically, Step 2-2 includes detailed steps as below.

Step 2-2-1, setting variable i to be an initial value and taking it as a time increase flag, obtaining current time of the authentication server, computing a current time factor according to the current time and assigning the current time factor to variable j.

Preferably, the initial value is 0.

Step 2-2-2, computing and generating an authentication code according to the variable j, comparing the generated authentication code with the authentication code, if a match is found, the authentication code is found; if a match is not found, going to Step 2-2-3.

Step 2-2-3, self-adding a preset value to the variable i, determining whether value of the variable i is satisfied with a preset condition, if yes, going to Step 2-2-4; if not, the authentication code being not found.

In the embodiment 2, a minute step number is set in case of computing the authentication code by a preset value.

Preferably, the preset value is 1, and the preset condition is less than half of the authentication window.

Step 2-2-4, adding value of variable i to value of variable j

Step 2-2-5, computing and generating the authentication code according to the computing result and comparing the generated authentication code with the authentication code, if a match is found, determining that the authentication code is found; if a match is not found, going to Step 2-2-6.

Step 2-2-6, deducting value of variable i from value of variable j.

Step 2-2-7, generating the authentication code according to the computing result and comparing the generated authentication code with the authentication code, if a match is found, determining that the authentication code is found; if a match is not found, returning to Step 2-2-3.

In the method of Step 2-2-1 to Step 2-2-7, each time an authentication code in the authentication window is generated, it is compared with the authentication code obtained from the trigger information; or optionally all authentication codes in the authentication window are generated one time and then are compared with the authentication code obtained from the trigger information separately.

Step 104, determining whether the authentication code is found, if yes, going to Step 105; if not, prompting error information and ending the process.

Step 105, extracting a time factor corresponding to the authentication code and checking for address information corresponding to the device identifying code.

Specifically, the time factor of the authentication code is a time factor by which the authentication code is generated.

Step 106, generating an authentication code list and/or a working staff log according to the time factor corresponding to the authentication code.

Specifically, the authentication code list includes, but not limited to, the authentication code and its corresponding authentication code generating time, in which the authentication code generating time is computed by the time factor corresponding to the authentication code.

The working staff log includes, but not limited to, working staff identification, address information and time of the working staff arriving at the address, in which the time of the working staff arriving at the address is computed by the time factor corresponding to the authentication code.

Step 107, storing the authentication code list and/or the working staff log.

Specifically, Step 107 further includes displaying and outputting the authentication code list and/or the working staff log.

Preferably, after Step 107, the method further includes a step as below.

Step 108, checking for a working staff log according to the working staff identification and determining whether there is an exception according to address information and time of the working staff arriving at the address in the working staff log, if there is an exception, prompting a corresponding exception.

Embodiment 3

Figure 3:
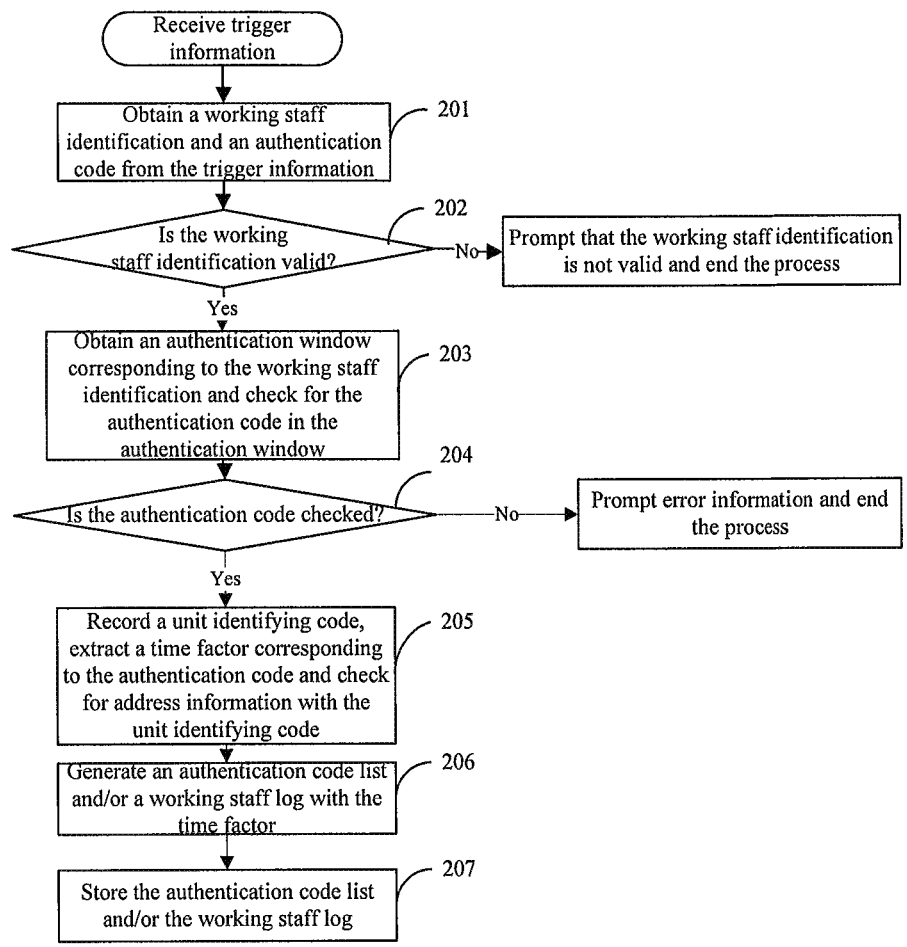
FIG. 3 is a flow chart of a routine recording method disclosed in Embodiment 3 of the invention.

As illustrated in FIG. 3, a routine recording method is provided in the embodiment 3, which includes the authentication server receiving trigger information and executing the following steps.

Step 201, obtaining working staff identification and an authentication code from trigger information.

Specifically, in the embodiment 3, the trigger information is sent to the authentication server in the form of short message, telephone and networking. The trigger information includes, but not limited to, the working staff identification and the authentication code, in which the authentication code is generated by the authentication code generating device.

Step 202, determining whether the working staff identification is legitimate, if yes, going to Step 203; if not, prompting that the working staff identification is not legitimate and ending the process.

Specifically, in the embodiment 3, the determining whether the working staff identification is legitimate includes that determining whether the working staff identification is stored in the authentication server, if yes, determining that the working staff identification is legitimate; if no, prompting that the working staff identification is not legitimate and ending the process.

Step 203, obtaining an authentication window corresponding to the working staff identification and checking for the authentication code in the authentication window.

Specifically, in the embodiment 3, the authentication window corresponding to the working staff identification can be one or more, and correspondingly Step 203 includes the following steps.

Step 3-1, checking for all device identifying codes corresponding to the working staff identification, stored in the authentication server.

Step 3-2, reading all authentication windows corresponding to the device identifying codes, stored in the authentication server.

Specifically, each device identifying code corresponds to one authentication window; and each authentication window corresponding to one device identifying code is a window comprised of all authentication codes pre-computed by the authentication server according to related information of the authentication code generating device within a preset time period. Preferably, the preset time period is one day. In details, the authentication server computes all authentication codes in the current day according to seed information of the authentication code generating device, forms authentication window, and stores the authentication window in the authentication server.

Step 3-3, comparing the authentication code with all authentication codes in each authentication window respectively, if there is a matched authentication code in some authentication window, determining that the authentication code is found; if there is not a matched authentication code in some authentication window, determining that the authentication code is not found.

In the embodiment 3, Step 203 can further include steps as below.

Step 4-1, checking for all device identifying codes corresponding to all working staff identifications, stored in the authentication server.

Step 4-2, obtaining all authentication window information corresponding to each device identifying code, stored in the authentication server.

Specifically, in the embodiment 3, one device identifying code corresponds to one item of authentication window information.

The authentication window information is size of the authentication window, viz. a number of all authentication codes of the authentication code generating device corresponding to the device identifying code within a preset time period. The authentication window information is computed by the authentication server according to the preset time period and an authentication code interval in the authentication code generating device corresponding to the device identifying code. The computing result can be obtained by and stored in the authentication server in any time before the obtaining step. Specifically, in the step 4-2, the computing result is read directly. The computing can also be implemented by the authentication server in the step 4-2. Preferably, the preset time period is one day.

Step 4-3, computing the authentication window according to each item of obtained authentication window information and time of the current authentication server and comparing the authentication code with all authentication codes in each authentication window respectively.

Specifically, the computing and generating the authentication window according to the obtained authentication window information and time of the current authentication server and comparing the authentication code with all authentication codes in each authentication window respectively includes the following steps.

Step 4-3-1, setting variable i to be an initial value and taking it as a time increasing identification, obtaining current time of the authentication server, computing a current time factor according to the current time of the authentication server and assigning the current time factor to variable j.

Preferably, in the embodiment 3, the initial value is 0.

Step 4-3-2, computing and generating an authentication code according to the variable j and comparing the generated authentication code with all authentication codes respectively, if a match is found, determining that the authentication code is found; if a match is not found, going to Step 4-3-3.

Step 4-3-3, self-adding a preset value to variable i and determining whether value of variable i is satisfied with a preset condition, if yes, going to Step 4-3-4; if no, determining that the authentication code is not found.

In the embodiment 3, a minute step number is set in case of computing the authentication code by a preset value.

Preferably, the preset value is 1, and the preset condition is less than half of the authentication window.

Step 4-3-4, adding value of variable i plus value of variable j.

Step 4-3-5, generating an authentication code according to the computing result and comparing the generated authentication code with the authentication code, if a match is found, determining that the authentication code is found, if the match is not found, going to Step 4-3-6.

Step 4-3-6, deducting value of variable i from value of variable j.

Step 4-3-7, generating an authentication code according to the computing result and comparing the generated authentication code with the authentication code, if a match is found, determining that the authentication code is found; if the match is not found, returning to Step 4-3-3.

In method of Step 4-2-1 to Step 4-2-7, each time one authentication code in the authentication window is generated, it is used to be compared with the authentication code obtained from the trigger information, or after all authentication codes in the authentication window are generated, they are used to be compared with the authentication code obtained from the trigger information respectively.

Step 204, determining whether the authentication code is found, if yes, going to Step 205; if no, prompting that the authentication code is not legitimate and ending the process.

Step 205, recording a device identifying code corresponding to the authentication code, extracting a time factor corresponding to the authentication code and checking for address information corresponding to the device identifying code.

Specifically, the time factor corresponding to the authentication code is a time factor by which the authentication code is generated.

Step 206, generating an authentication code list and/or a working staff log according to the time factor.

Specifically, the authentication code list includes, but not limited to, the authentication code and its corresponding authentication code generating time, in which the authentication code generating time is computed by a time factor corresponding to the authentication code.

The working staff log includes, but not limited to, the working staff identification, address information and time of the working staff arriving at the address, in which time of the working staff arriving at the address is computed by the time factor corresponding to the authentication code.

Step 207, storing the authentication code list and/or the working staff log.

Specifically, Step 207 can further include displaying and outputting the authentication code list and/or the working staff log.

Preferably, after Step 207, the method further includes a step as below.

Step 208, checking for corresponding working staff log according to the working staff identification and determining whether there is an exception in the address information and the time of arriving at the address in the working staff log, if there is an exception, prompting the corresponding exception.

Embodiment 4

Figure 4:
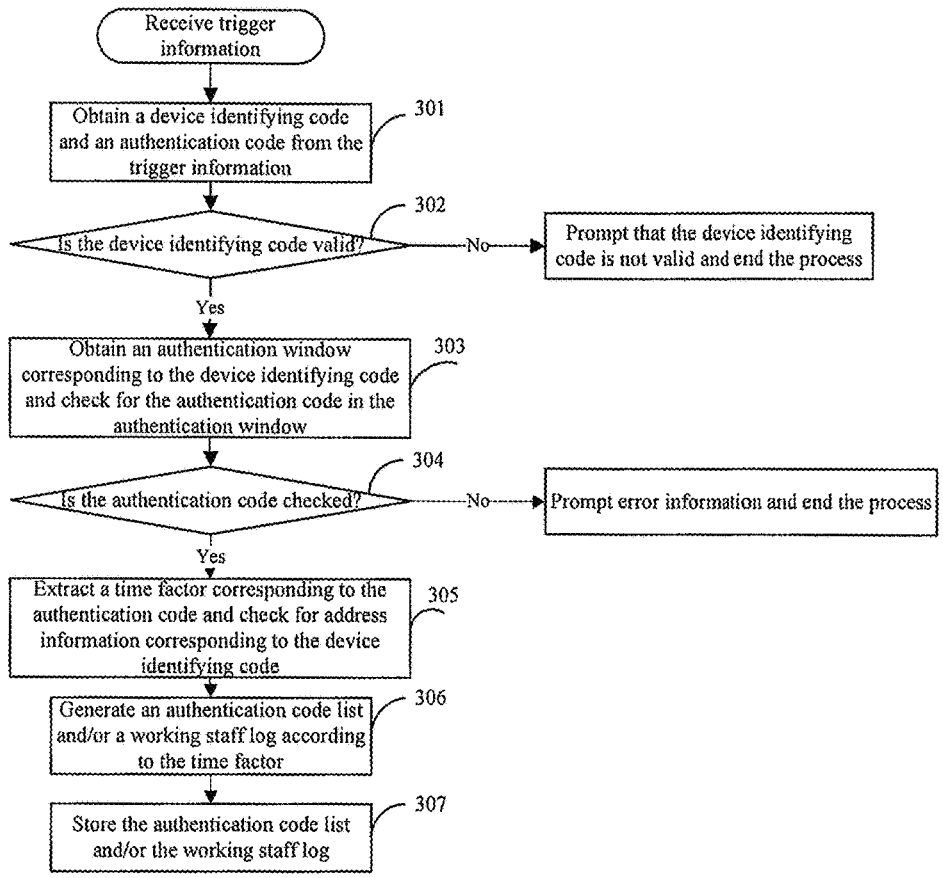
FIG. 4 is a flow chart of a routine recording method disclosed in Embodiment 4 of the invention.

As illustrated in FIG. 4, a routine recording method is provided in the embodiment 4, which includes an authentication server receiving trigger information and executing the following steps.

Step 301, obtaining a device identifying code and an authentication code from the trigger information.

Specifically, in the embodiment 4, the trigger information is sent to the authentication server in the form of short message, telephone or networking. The trigger information includes, but not limited to, a device identifying code and an authentication code, in which the authentication code is generated by an authentication code generating device.

Step 302, determining whether the device identifying code is legitimate, if yes, going to Step 303; if no, prompting that the device identifying code is not legitimate and ending the process.

Specifically, the determining whether the device identifying code is legitimate is determining whether the device identifying code is stored in the authentication server, if yes, determining that the device identifying code is legitimate; if no, prompting that the device identifying code is not legitimate and ending the process.

Step 303, obtaining an authentication window corresponding to the device identifying code and checking for the authentication code in the authentication window.

Specifically, Step 303 can include the following steps.

Step 5-1, checking for the authentication window corresponding to the device identifying code.

Specifically, the authentication window corresponding to the device identifying code is a window comprised of all authentication codes pre-computed by the authentication server within a preset time period according to related information of the authentication code generating device corresponding to the device identifying code. Preferably, the preset time period is one day. The step is executed by that the authentication server computes all authentication codes of the current day according to seed information of the authentication code generating device, forms the authentication window and stores the authentication window in the authentication server.

Step 5-2, comparing the authentication code with all authentication codes in the authentication window respectively.

If there is a matched authentication code in the authentication window, determining that the authentication code is found; if there is not the matched authentication code in the authentication window, determining that the authentication code is not found.

Specifically, Step 303 can further include the following steps.

Step 6-1, checking for authentication window information corresponding to the device identifying code, stored in the authentication server.

Specifically, the authentication window information is size of the authentication window, viz. a number of all authentication codes of the authentication code generating device corresponding to the device identifying code within a preset time period. The authentication window information is computed by the authentication server according to the preset time period and an authentication code interval in the authentication code generating device corresponding to the device identifying code. The computing result can be obtained by and stored in the authentication server in any time before the obtaining step. Specifically, in the step 6-1, the computing result is read directly. The computing can also be implemented by the authentication server in the step 6-1. Preferably, the preset time period is one day.

Step 6-2, computing and generating an authentication window according to the obtained authentication window information and time of the current authentication server and comparing the authentication code with all authentication codes within the authentication window respectively, if there is a matched authentication code in the authentication window, determining that the authentication code is found; if there is not the matched authentication code in the authentication window, determining that the authentication code is not found.

Step 6-2 can further include the following steps.

Step 6-2-1, setting variable i to be an initial value, taking it as a time increasing identification, obtaining current time of the authentication server and according to which computing a current time factor and assigning the current time factor to variable j.

Preferably, the initial value is 0.

Step 6-2-2, generating an authentication code according to variable j and comparing the generated authentication code with the authentication code, if a match is found, determining that the authentication code is found; if the match is not found, going to Step 6-2-3.

Step 6-2-3, self-adding a preset value to variable i and determining whether value of variable i is satisfied with a preset condition, if yes, going to Step 6-2-4; if no, determining that the authentication code is not found.

In the embodiment 4, a minute step number is set in case of computing the authentication code by a preset value.

Preferably, the preset value is 1 and the preset condition is less than half of the authentication window.

Step 6-2-4, adding value of variable i to value of variable j.

Step 6-2-5, generating an authentication code according to the computing result and comparing the generated authentication code with the authentication code, if a match is found, determining that the authentication code is found; if a match is not found, going to Step 6-2-6.

Step 6-2-6, deducting value of variable i from value of variable j.

Step 6-2-7, generating an authentication code according to the computing result and comparing the generated authentication code with the authentication code, if a match is found, determining that the authentication code is checked; if the match is not found, going to Step 6-2-3.

In method of Step 6-2-1 to Step 6-2-7, each time one authentication code in the authentication window is generated, it is used to be compared with the authentication code obtained from the trigger information, or after all authentication codes in the authentication window are generated, they are used to be compared with the authentication code obtained from the trigger information respectively.

Step 304, determining whether the authentication code is found, if yes, going to Step 305; if no, prompting error information and ending the process.

Step 305, extracting a time factor corresponding to the authentication code and checking for corresponding address information according to the device identifying code.

The time factor corresponding to the authentication code is a time factor by which the authentication code is generated.

Step 306, generating an authentication code list and/or a working staff log according to the time factor.

Specifically, the authentication code list includes, but not limited to, the authentication code and its corresponding authentication code generating time. The authentication code generating time is computed by a time factor corresponding to the authentication code.

Before generating the working staff log, the method further includes checking for the working staff identification and address information corresponding to the device identifying code. The working staff log includes, but not limited to, the working staff identification, the address information and time of the working staff arriving at the address. The time of the working staff arriving at the address is computed by a time factor corresponding to the authentication code.

Step 307, storing the authentication code list and/or the working staff log.

Specifically, Step 307 can further include a displaying and outputting the authentication code list and/or the working staff log.

Embodiment 5

Figure 5:
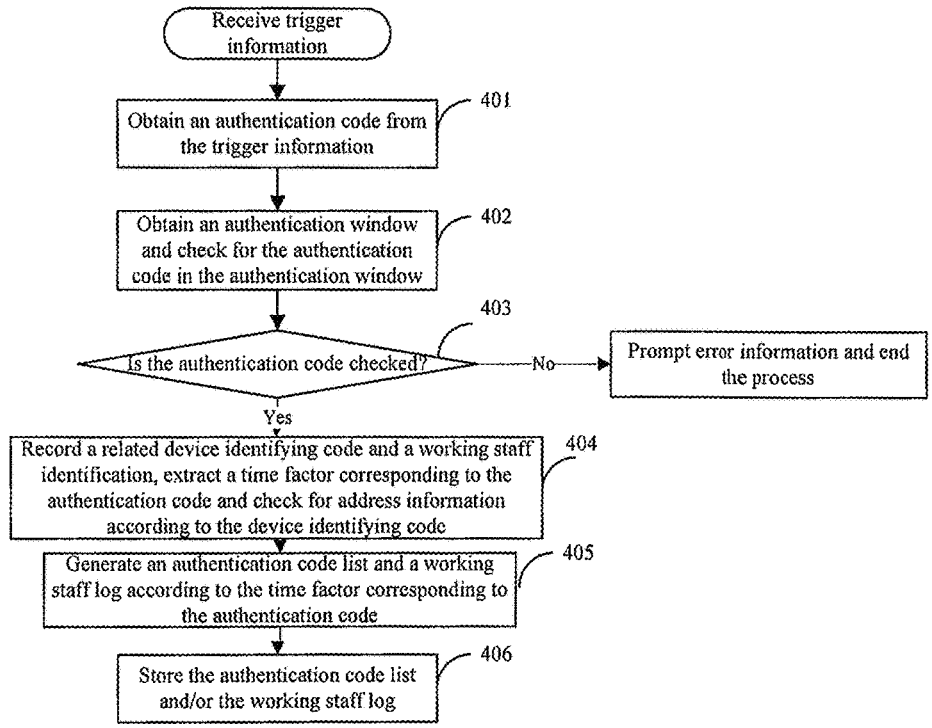
FIG. 5 is a flow chart of a routine recording method disclosed in Embodiment 5 of invention.

As illustrated in FIG. 5, a routine recording method is provided in the embodiment 5, which includes an authentication server receiving trigger information and executing the following steps.

Step 401, obtaining an authentication code from the trigger information.

Specifically, the trigger information is sent to the authentication server in the form of short message, telephone and networking, etc. The trigger information includes, but not limited to, the authentication code. The authentication code is generated by the authentication code generating device.

Step 402, obtaining an authentication window and checking for the authentication code in the authentication window.

Specifically, the authentication window can be one or more, and correspondingly, Step 402 can include following steps.

Step 7-1, checking for all authentication windows stored in the authentication server.

Specifically, the authentication window is a window comprised of all authentication codes pre-computed by the authentication server according to related information of all authentication code generating devices within a preset time period and each authentication code generating device corresponds to one authentication window. Preferably, the preset time period is one day. The step is executed by that the authentication server computes all authentication codes of the current day according to seed information of the authentication code generating device, forms an authentication window and stores the authentication window in the authentication server.

Step 7-2, comparing the authentication code with all authentication codes in each authentication window respectively.

If there is a matched authentication code in one authentication window, determining that the authentication code is found; if there is not the matched authentication code in one authentication window, determining that the authentication code is not found.

Specifically, Step 402 can further include the following steps.

Step 8-1, obtaining all authentication window information stored in the authentication server.

Specifically, the authentication window information is a size of the authentication window, viz. a number of all authentication codes of the authentication code generating code corresponding to the device identifying code within a preset time period. The authentication window information is computed by the authentication server according to the preset time period and an authentication code interval of the authentication code generating device corresponding to the device identifying code. The computing result can be obtained by and stored in the authentication server at any time before the step 8-1, or can be read directly, or the computing can be executed by the authentication server in the step 8-1. Preferably, the preset time period is one day.

Step 8-2, computing authentication window according to each item of obtained authentication window information and time of the current authentication server respectively and comparing the authentication code with all authentication codes in each authentication window respectively.

Computing authentication window according to each item of obtained authentication window information and time of the current authentication server respectively and comparing the authentication code with all authentication codes in each authentication window respectively includes the following steps.

Step 8-2-1, setting variable i to be an initial value and taking it as a time increasing identification, obtaining current time of the authentication server and computing a current time factor according to it and assigning the current time factor to variable j.

Preferably, the initial value is 0 in the embodiment 5.

Step 8-2-2, computing and generating an authentication code according to variable j and comparing the generated authentication code with the authentication code, if a match is found, determining that the authentication code is checked; if the match is not found, going to Step 8-2-3.

Step 8-2-3, self-adding a preset value to variable i and determining whether value of variable i is satisfied with a preset condition, if yes, going to Step 8-2-4 if no, determining that the authentication code is not found.

In the embodiment 5, a minute step number is set in case of computing the authentication code by a preset value.

Preferably, the preset value is 1 and the preset condition is less than half of the authentication window.

Step 8-2-4, adding value of variable i to value of variable j.

Step 8-2-5, generating an authentication code according to the computing result and comparing the generated authentication code with the authentication code, if a match is found, determining that the authentication code is found; if no, going to Step 8-2-6.

Step 8-2-6, deducting value of variable i from value of variable j.

Step 8-2-7, generating an authentication code according to the computing result and comparing the generated authentication code with the authentication code, if a match is found, determining that the authentication code is found; if no, returning to Step 8-2-3.

In method of Step 8-2-1 to Step 8-2-7, each time an authentication code in the authentication window is generated, it is used to be compared with the authentication code obtained from the trigger information, or after all authentication codes in the authentication window are generated, they are used to be compared with the authentication code obtained from the trigger information respectively.

Step 403, determining whether the authentication code is found, if yes, going to Step 404; if no, prompting error information and ending the process.

Step 404, recording a corresponding device identifying code and a working staff identification, extracting a time factor corresponding to the authentication code and checking for corresponding address information according to the device identifying code.

Specifically, the time factor corresponding to the authentication code is a time factor by which the authentication code is generated.

Step 405, generating an authentication code list and/or a working staff log according to the time factor corresponding to the authentication code.

Specifically, the authentication code list includes, but not limited to, the authentication code and corresponding authentication code generating time, in which the authentication code generating time is computed by the time factor corresponding to the authentication code.

Before generating the working staff log, the method further includes checking for corresponding address information and working staff identification according to the device identifying code. The working staff log includes, but not limited to, the working staff identification, address information and time of the working staff arriving at the address. The time of the working staff arriving at the address is computed by the time factor corresponding to the authentication code.

Step 406, storing the authentication code list and/or the working staff log.

Specifically, Step 406 can further include displaying and outputting the authentication code list and/or the working staff log.

The above mentioned are only preferred embodiments of the invention, not a limit to scope of the protection of the invention. Any modifications or substitutions made by those skilled in the art within the technology scope of the invention should fall below the scope of the protection of the invention. Therefore, the scope of the protection of the invention should be based on the claims.

The invention claimed is:

1. A method for recording a traveling data of a staff member, wherein the traveling data is the summation of: a staff member identification, a location, and a time of the staff member arriving at the location, the method comprising the steps of:

generating an authentication code by an authentication code generating device which is at the location;

entering the authentication code displayed on the authentication code generating device into a portable device by the staff member at the location;

reporting to an authentication server from the portable device;

receiving trigger information comprising the authentication code by the authentication server;

obtaining all authentication windows corresponding to a device identification code and the staff member identification by the authentication server;

determining whether the staff member identification is legitimate, if yes, obtaining all authentication windows corresponding to the device identification code and the staff member identification, wherein:

obtaining all authentication windows corresponding to the device identification code and the staff member identification stored in the authentication server; or obtaining all authentication windows corresponding to the device identification code and the staff member identification stored in the authentication server, and generating additional authentication windows necessary according to the obtained authentication windows; and if no, not obtaining any authentication windows, and prompting that the staff member identification is not legitimate, the device identifying code is not legitimate, and the staff member identification does not match the device identifying code;

checking whether the authentication code is in the authentication windows;

executing a handling exception if the authentication code is not found in the authentication windows;

extracting a time factor corresponding to the authentication code if the authentication code is found;

recording the device identifying code corresponding to the authentication code;

checking for the location corresponding to the device identifying code;

recording the traveling data of the staff member by generating and storing an authentication code list and/or a staff member log;

wherein the authentication code list includes the authentication code and a corresponding authentication code generating time;

the staff member log includes the staff member identification, the location, and the time of the staff member arriving at the location;

the authentication code generating time and the time of the staff member arriving at the location are computed by the authentication server according to the time factor corresponding to the authentication code.

2. The method of claim 1, wherein all authentication windows stored in the authentication server include all authentication codes pre-computed by the authentication server according to the authentication code generating device within a preset time period.

3. The method of claim 1, wherein the generating additional authentication windows necessary according to the obtained authentication windows and checking for the authentication code in the authentication windows comprises:

Step a) setting a first variable by assigning an initial value to a first variable, obtaining a current time of the authentication server, computing a current time factor according to the current time of the authentication server and assigning the current time factor to a second variable, generating a first authentication code according to a value of the second variable, and comparing the first authentication code with the authentication code, if a match is found, determining that the authentication code is found; and if the match is not found, going to Step b);

Step b) self-adding a preset value to the first variable, and determining whether the value of the first variable is satisfied with a preset condition, if yes, going to Step c); and if no, determining that the authentication code is not found;

Step c) adding the first variable to the second variable, generating a second authentication code according to the addition of the first variable to the second variable, comparing the second authentication code with the authentication code, if a match is found, determining that the authentication code is found; and if the match is not found, going to Step d); and Step d) deducting the first variable from the second variable, generating a third authentication code according to the deduction of the first variable from the second variable, comparing the third authentication code with the authentication code, if a match is found, determining that the authentication code is found; and if no, returning to Step b).

* * * * *